June 12, 1923. 1,458,379
H. N. ATWOOD
VEHICLE WHEEL
Filed Nov. 21, 1921 3 Sheets-Sheet 3
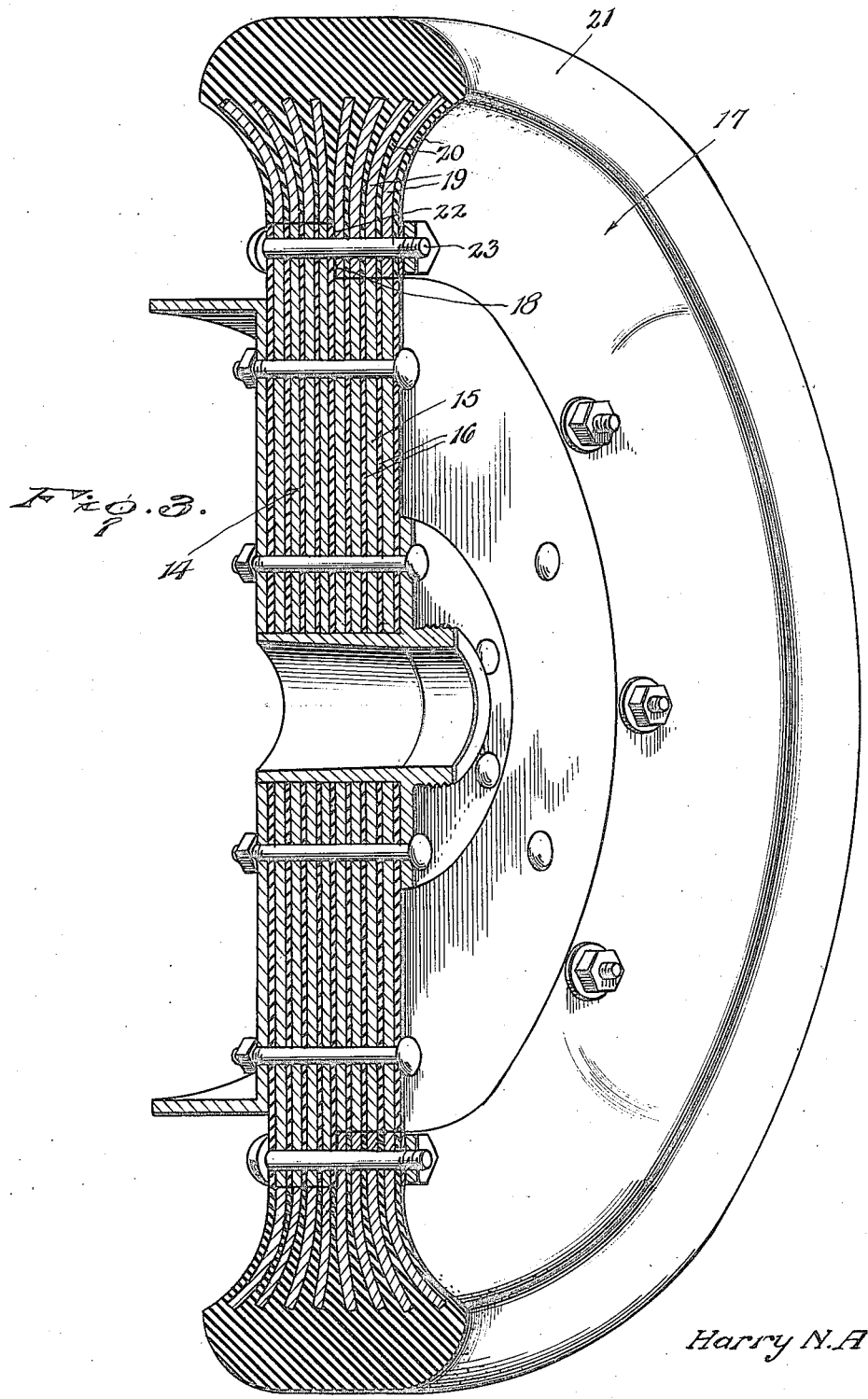
Inventor
*Harry N. Atwood.*
By *Lacey & Lacey*, Attorneys Patented June 12, 1923.

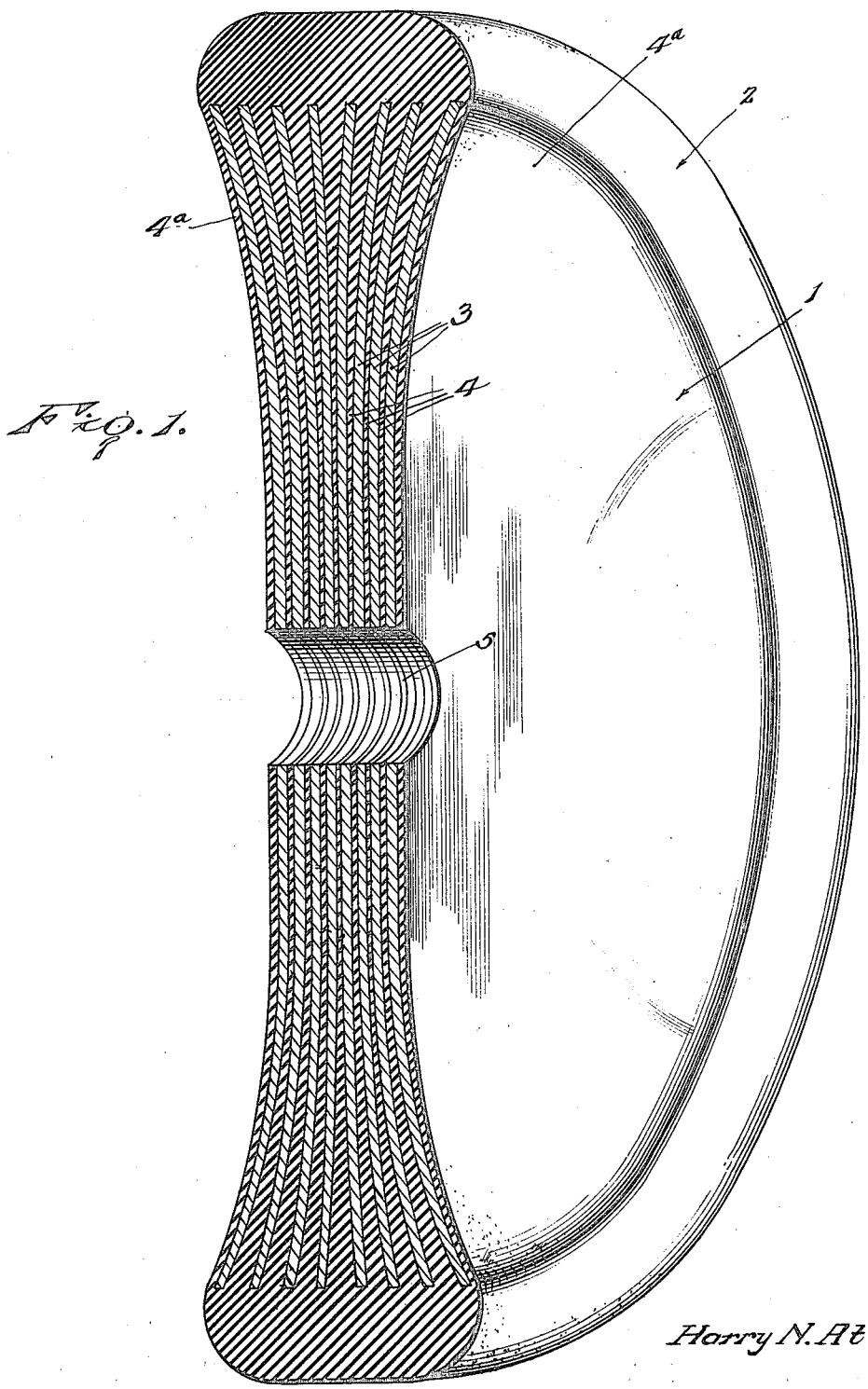

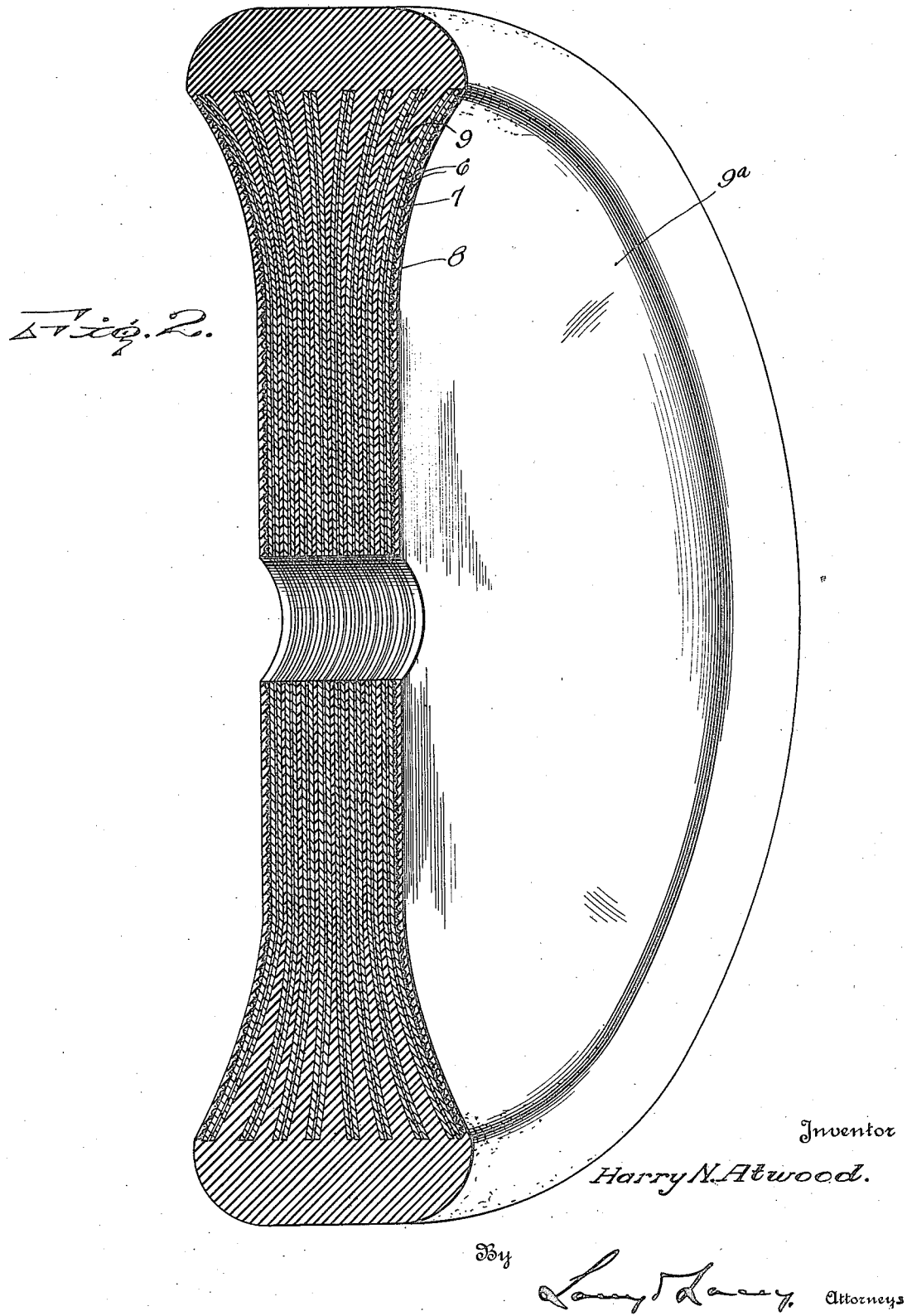

1,458,379

UNITED STATES PATENT OFFICE.

HARRY N. ATWOOD, OF SMITHFIELD, NORTH CAROLINA, ASSIGNOR TO RUBWOOD, INC., OF LAWRENCE, MASSACHUSETTS, A CORPORATION OF MASSACHUSETTS.

VEHICLE WHEEL.

Application filed November 21, 1921. Serial No. 516,766.

*To all whom it may concern:*

Be it known that I, HARRY N. ATWOOD, a citizen of the United States, residing at Smithfield, in the county of Johnston and State of North Carolina, have invented certain new and useful Improvements in Vehicle Wheels, of which the following is a specification.

This invention relates to improvements in vehicle wheels, and in a sense to those of the solid tire type.

It is usually the practice in constructing wheels of the solid tire type to build up a wheel body of wood, fit thereto the standard hub parts, equip the body with a felloe band, and shrink onto this band a metallic tire band or rim onto which the solid rubber tire is molded. It is evident that a wheel so constructed will possess great rigidity and while this, at first thought, might seem to be advantageous, it is in fact undesirable. The shocks of impact to which such a wheel are subjected are not at all absorbed but are transmitted to the running gear setting up a vibration which is detrimental to the proper functioning of the running gear and propelling means for the vehicle and certain to shorten the life thereof. It is therefore one of the primary objects of the present invention to provide a wheel devoid of elements which would tend to render it rigid to an undesirable degree and which wheel will therefore possess a degree of resiliency enabling it to absorb, to a great extent, the shocks and impacts to which it is subjected thus not only prolonging the life of the vehicle as a whole but generally promoting the easy riding of the vehicle whether it be of the passenger type or in the nature of a truck. In this connection the invention of course contemplates the provision of a wheel which when subjected to unusual shocks or stresses such for example as lateral impacts, will yield to a degree sufficient to effect absorption of the shock and thus obviate splintering of the wheel as would result under similar conditions if the wheel were of the ordinary construction and for example embodying spokes.

Another equally important object of the invention is to provide a wheel of the solid tire type in which the tire constitutes an integral part of the wheel body. It will be immediately recognized that such an integral structure possesses many advantages over one in which the tire is a part separate from the body of the wheel. The time, labor, and other expenses incident to the molding of the usual rubber tire to the rim and the assemblage of this rim with the wheel felloe, as well as the building up of the body of the wheel and the application thereto of the felloe band, are to a great extent eliminated or materially reduced; there is no likelihood of disarrangement of the component parts of the wheel under running conditions; the employment of parts tending to impair the resiliency of the wheel is avoided; and, there is not the liability to breakage which is present in the ordinary type of wheel.

Another important object of the invention is to provide a vehicle wheel so constructed that in its manufacture it may be given any desired shape and dimensions and may be readily adapted for the application thereto of standard wheel parts such for example as the hubs and the securing bolts therefor, brake drums, and the like.

In the accompanying drawings:

Figure 1 is a sectional perspective view of one form of vehicle wheel embodying the present invention;

Figure 2 is a similar view illustrating another form of wheel;

Figure 3 is a similar view illustrating a modification in which a portion of the wheel is separable from the body to provide for a renewal of the parts which are most subjected to wear.

In all forms of the invention with the exception of Figure 3 and except for such appliances as require to be assembled with the wheel as for example the hub, brake band, and the like, a wheel embodying the invention constitutes an integral structure and while the portion of the wheel which contacts the ground surface serves precisely the same purpose as the ordinary solid rubber tire, it will probably be more proper and exact to consider the wheel as comprising a body and an integral elastic tread. The wheel may therefore be said to comprise a body portion and a tread portion, the former being indicated in general by the numeral 1 and the latter in general by the numeral 2.

In that form of the invention shown in Figure 1 the body 1 of the wheel is of laminated structure and comprises a plurality of veneer plies 3 and intervening plies 4 of rubber. The veneer plies 3 are of disk-like form and when properly arranged, the grain in adjacent plies will run in non-corresponding directions so as to secure the greatest possible degree of reinforcement and render the wheel uniformly resistant to stresses which would tend to split it. The veneer plies 3 and rubber bonding plies 4 are alternately disposed so that the plies 4 serve not only as a shock absorbing medium but also as a means for bonding together the plies 3. Two of the plies 4, indicated specifically by the numeral 4ª, are united to the outer faces of the outermost ones of the veneer plies 3 so as to constitute facing surfaces for the wheel body. It is the practice to form the felly of a vehicle wheel of a width or thickness greater than the thickness of the body at the hub and therefore in the illustrated embodiment of the invention the rubber bonding plies 4, with the possible exception of the plies 4ª, are formed of gradually increasing thickness from their centers toward their peripheral portions with the result that when interposed between the veneer plies 3, the latter plies, if not already so formed, will be constrained to assume a more or less dished or concave form, the central portions of the said veneer plies, in the completed structure, occupying substantially parallel planes but the peripheral portions being deflected to a greater or less extent in the manner stated. The deflection of the veneer plies 3 is such that the plies which are located substantially at the middle of the assemblage are but slightly deflected or dished but the degree of deflection or curvature is increased in successive plies as the opposite faces of the wheel body are approached. As a consequence of the arrangement and formation of the component parts of the wheel body above described, the body will be of gradually increasing thickness from its central portion to its periphery.

The tread 2 is built up from an integral mass of rubber which, in the course of manufacture of the wheel, is applied about the periphery of the body and roughly shaped to the required form, and after the plies 3 and 4 comprising the wheel body have been assembled and the rubber which is to constitute the tread 2 has been applied about the periphery of the body, the assemblage is placed within a suitable mould and subjected to heat and pressure as a consequence of which treatment the rubber will be vulcanized and the plies 4 will become intimately united to the veneer plies 3 and will bond the latter plies together and will constitute a resilient or cushioning component element of the wheel body. Also during this process of vulcanization the tread 2 will become intimately incorporated with the peripheral portions of the bonding plies 4 so that the completed product will constitute an integral or composite whole no portion of which is separable from another portion without actual disintegration or tearing apart of the structure. It will be understood of course that the tread 2 may be of any required width and thickness and that its ground engaging surface may be fashioned in any suitable manner to provide against skidding or to provide for increased tractive engagement with the road surface. In fact the general form or shape of the body and tread is immaterial so long as there is present the salient feature of the invention which is the integral union or intimate incorporation of the tread with the body so that the wheel in its entirety except for the hub and other fixtures which may be applied thereto, is to all intents and purposes a one piece structure.

It will be understood that the veneer plies 3 constitute the reinforcing and stabilizing medium of the wheel structure, imparting thereto a degree of rigidity sufficient to insure against collapse or distortion of the wheel under running conditions and yet possessing a degree of resiliency adapting the wheel to yield to the force of shocks and impacts to an extent to absorb the same without injuring the structure. The rubber bonding plies serve of course not only as a bonding means for the veneer plies but also, in connection with the tread 2, as the fundamental shock absorbing and cushioning medium of the structure. As a consequence of the arrangement of the various plies and the tread, the wheel will be found to possess substantially the resiliency of a pneumatic wheel and certainly much less rigidity than a solid tire wheel of the ordinary type, and yet the construction of the wheel body is such that even lateral shocks or impacts will be absorbed and practically all liability of splintering or shattering of the wheel is eliminated.

It will be observed by reference to Figure 1 of the drawings that the outermost plies 4ª merges with and constitute an integral part of the sides of the tread 2 so that at no point in the structure are the veneer plies exposed in a manner which would render them subject to deterioration through the absorption of moisture.

The wheel as a whole may be shaped as desired and the body may be constructed in any manner found necessary for the application to the wheel of the usual appliances or equipment such as the hub, brake drum, and the like, and in the present instance the body is formed centrally with an opening 5 to receive a hub of ordinary construction.

The structure shown in Figure 2 of the drawings is substantially identical with that shown in Figure 1, the exception being that in this case the veneer plies, which are indicated by the numeral 6, are arranged in pairs or other multiples and the plies comprising each unit are united to one another by intervening bonding plies 7 of rubber. Also in this form of the invention it is preferable that a foraminous ply 8 of wire mesh or similar material be embedded in the outermost bonding plies which are in this case indicated by the numeral 9ª, the other bonding plies being indicated by the numeral 9 and corresponding in every respect to the bonding plies 4 previously described.

In the form of the invention shown in Figures 1 and 2 of the drawings, the veneer plies are dished or concave in gradually increasing degrees from the center of the assemblage to the faces of the wheel body and likewise all of the intervening bonding plies are gradually increased in thickness to the same uniform degree from their central portions to their peripheral portions.

In the previously described forms of the invention the body and tread of the wheel are in fact integrally united or incorporated with each other so that these parts constitute truly an integral structure but in the form of the invention shown in Figure 3 of the drawings the structure is modified in such manner that the tread portion may be dismounted or separated from the body of the structure when the tread becomes so worn as to be useless. In this structure the body of the wheel is indicated by the numeral 14 and is built up of veneer plies 15 and bonding plies 16 as in the previously described forms. However in this instance the body 14 is provided with a demountable tread section indicated in general by the numeral 17 and in order to accommodate the said section the periphery of the body 14 may be rabbeted as indicated by the numeral 18. The demountable tread section 17 is very similar in structure to the peripheral portion of the wheel structure shown in Figure 1 of the drawings and comprises veneer plies 19 and bonding plies 20 which latter are intimately united to and incorporated with the tread of the said section which tread is indicated by the numeral 21. The inner peripheral portion of the section 17 is rabbeted as indicated by the numeral 22 so as to adapt it to be assembled with the rabbeted periphery of the body 14, and bolts 23 are adapted to be removably fitted through the rabbeted peripheries of the body and tread section for the purpose of removably securing the latter in place upon the former.

It will be understood that wire mesh plies may be embedded in any or all of the bonding and facing plies in the various illustrated embodiments of the invention or may be omitted altogether.

Having thus described the invention what is claimed as new is:

1. A vehicle wheel comprising a body and tread, the body being made up of plies of veneer and rubber material, the tread being also of rubber material and integrally united with the last mentioned plies of the body.

2. A vehicle wheel comprising a body and tread, the body being made up of plies of veneer and bonding plies of rubber and likewise having rubber plies facing its sides, the tread being likewise of rubber and constituting an integral part with the rubber bonding plies and the facing plies of the body.

3. A vehicle wheel comprising a body made up of veneer plies and intervening bonding plies of rubber, the veneer plies having their peripheral portions outwardly curved in the direction of the adjacent faces of the body, and a tread peripherally surrounding the body and integrally united with the said bonding plies.

4. A vehicle wheel comprising a body and tread, the body being made up of plies of veneer and intervening bonding plies of rubber, the veneer plies being outwardly curved at their peripheral portions in the direction of the relatively adjacent sides of the wheel and with gradually increasing degrees of curvature and the bonding plies being gradually increased in thickness at their peripheral portions to correspond to the increase in width of the spaces between relatively adjacent veneer plies, the tread being intimately incorporated with the said bonding plies.

5. A vehicle wheel comprising a body made up of veneer plies and intervening bonding plies of rubber, and a combined rim and tread comprising an integral structure made up of veneer plies and intervening bonding plies of rubber, the tread portion being intimately incorporated with the bonding plies, and means removably securing the said combined rim and tread to the body.

6. A vehicle wheel having a tread of cushioning material and a body made up of plies of veneer bonded together by cushioning material, the tread and body of the wheel being integrally united.

7. A vehicle wheel comprising a body and a tread the body being made up of continuously circular reinforcing plies and bonding cushioning material, the tread being also made of cushioning material and integrally united with the bonding material, 8. A vehicle wheel comprising a body consisting of plies of veneer having their peripheral portions dished, the plies being arranged at opposite sides of the middle of the body with their said portions curving in opposite directions, and a tread resiliently supported by said portions.

9. A vehicle wheel comprising a body consisting of plies of body material having their peripheral portions dished, the plies being arranged with their said portions curving in opposite directions, and a tread extending about the portions and supported thereby.

In testimony whereof I affix my signature.

HARRY N. ATWOOD. [L. S.]